United States Patent [19]

Payne

[11] Patent Number: 4,730,672

[45] Date of Patent: Mar. 15, 1988

[54] METHOD OF REMOVING AND CONTROLLING VOLATILE CONTAMINANTS FROM THE VADOSE LAYER OF CONTAMINATED EARTH

[75] Inventor: Frederick C. Payne, Charlotte, Mich.

[73] Assignee: Midwest Water Resource, Inc., Charlotte, Mich.

[21] Appl. No.: 22,105

[22] Filed: Mar. 4, 1987

[51] Int. Cl.$^4$ ............................................. E21B 43/40
[52] U.S. Cl. ................................... 166/266; 166/267; 166/369; 210/901
[58] Field of Search ............................... 166/265–268, 166/278, 369, 370; 210/901, 194; 405/128, 129

[56] References Cited

U.S. PATENT DOCUMENTS

| | | | |
|---|---|---|---|
| 3,277,962 | 10/1966 | Flickinger et al. | 166/278 |
| 4,026,355 | 5/1977 | Johnson et al. | 166/369 |
| 4,167,973 | 9/1979 | Forte et al. | 166/267 |
| 4,183,407 | 1/1980 | Knopik | 166/270 |
| 4,303,127 | 12/1981 | Freel et al. | 166/267 |
| 4,323,122 | 4/1982 | Knopik | 166/369 |
| 4,344,722 | 8/1982 | Blais | 405/128 |
| 4,442,901 | 4/1984 | Zison | 166/369 |
| 4,469,176 | 9/1984 | Zison et al. | 166/369 |
| 4,487,054 | 12/1984 | Zison | 166/369 |
| 4,518,399 | 5/1985 | Croskell et al. | 405/129 |
| 4,593,760 | 6/1986 | Visser et al. | 166/267 |
| 4,611,950 | 9/1986 | Russomano | 405/128 |
| 4,660,639 | 4/1987 | Visser et al. | 166/267 |

OTHER PUBLICATIONS

Astle et al., "Estimating Vapor and Odor Emission Rates from Hazardous Waste Sites", Offsite Safety, pp. 326–330, undated.

Amirtharajah, "Fundamentals and Theory of Air Scour", Journal of Environmental Engineering, Jun. 1984, pp. 573–606.

Carlson, "Recovery of Landfill Gas at Mountain View", U.S. Environmental Protection Agency Publication, 1977.

Wanielista et al., "Municipal Solid Waste: Land Disposal", Aug. 1979, US EPA.

Schultz, "Land Disposal of Hazardous Wastes", Aug. 1978, US EPA.

Rogoshewski et al., "Remedial Action Technology for Waste Disposal Sites", Noyes Data Corp. Report, 1983.

Primary Examiner—Stephen J. Novosad
Assistant Examiner—Bruce M. Kisliuk
Attorney, Agent, or Firm—Thomas J. Dodd

[57] ABSTRACT

A method and apparatus of collecting volatile contaminants from the vadose layer of earth. The apparatus is a closed-loop device which includes one or more contaminant withdrawal wells surrounded by multiple air reinjection wells connected by a conduit. One or more pumps serve to draw volatilized contaminant through the withdrawal well to the connecting conduit where it is captured or neutralized. Residual air from the withdrawal well is urged back into the ground through the air reinjection wells to encourage further contaminant to move toward the withdrawal well for collection.

9 Claims, 4 Drawing Figures

METHOD OF REMOVING AND CONTROLLING VOLATILE CONTAMINANTS FROM THE VADOSE LAYER OF CONTAMINATED EARTH

FIELD OF THE INVENTION

This invention relates to an improved method of removing volatile contaminants from above the water table in the earth (the vadose zone), and to apparatus for effecting the method which also captures or neutralizes the contaminants for effective disposal.

BACKGROUND OF THE INVENTION

Soil and water contamination due to spillage of volatile chemicals has long posed a serious problem in the obtainment of clean drinking and irrigation water. Initial studies in the contaminant removal area were conducted near landfill sites where migration of methane through the soil caused water and soil contamination in adjacent areas. The results of these studies may be found in various trade publications, some of which accompany the information disclosure sheet filed with this application.

There are several methods which have previously been used to remove industrial pollutants from the vadose zone of earth. The most common of these methods is excavation in which all of the contaminated soil is removed and eventually replaced with fresh earth. While excavation is a relatively simple process, it is not practical when large volumes are involved due to prohibitive cost and time factors.

Another method involves a circulation system for leaching contaminants from the vadose layer into the water table where they are recovered by a water removal well and a pump. This process is shown generally in U.S. Pat. No. 4,167,973 as well as other patents. Such processes are not always successful due to low water solubility of most common industrial pollutants, which results in lengthy and often costly recovery.

A third method involves the creation of a vacuum within a withdrawal well in the vadose zone. By injecting air into the soil at points surrounding the withdrawal well, contaminants are urged towards the withdrawal well where they are vaporized and collected by vacuum withdrawal. Such method is described in U.S. Pat. Nos. 4,183,407 and 4,593,760. These methods are generally effective in contaminant recovery but do not provide for satisfactory disposal of most contaminants.

SUMMARY OF THE INVENTION

The method and apparatus of this invention utilizes the principles of vacuum vaporization and extraction of contaminants from the vadose layer. The method involves drilling one or more contaminant withdrawal wells into the vadose layer of earth where contaminants are present. A plurality of air injection wells are drilled spaced from the central withdrawal well. Impermeable conduit is introduced into each well which is then backfilled. All conduits are connected for continued air flow and a neutralizing element placed between the withdrawal well conduit and the connecting conduits to provide clean air flow to all air injection wells and facilitate contaminant recovery.

Accordingly, it is an object of this invention to provide a novel method and apparatus for recovery of volatile contaminants from the vadose zone.

Another object of this invention is to provide for a closed loop vacuum apparatus which efficiently draws vaporized contaminants from the vadose zone and which neutralizes the contaminants and recirculates clean air back to the earth.

Another object of this invention is to provide for a soil contaminant recovery method which is economical.

Still another object of this invention is to provide for a soil contaminant recovery method which complies with regulatory agency requirements and which allows quantitative testing to be performed during system operation.

Other objects of this invention will be readily apparent upon a reading of the following description.

DESCRIPTION OF THE PREFERRED EMBODIMENT

Figure 1:
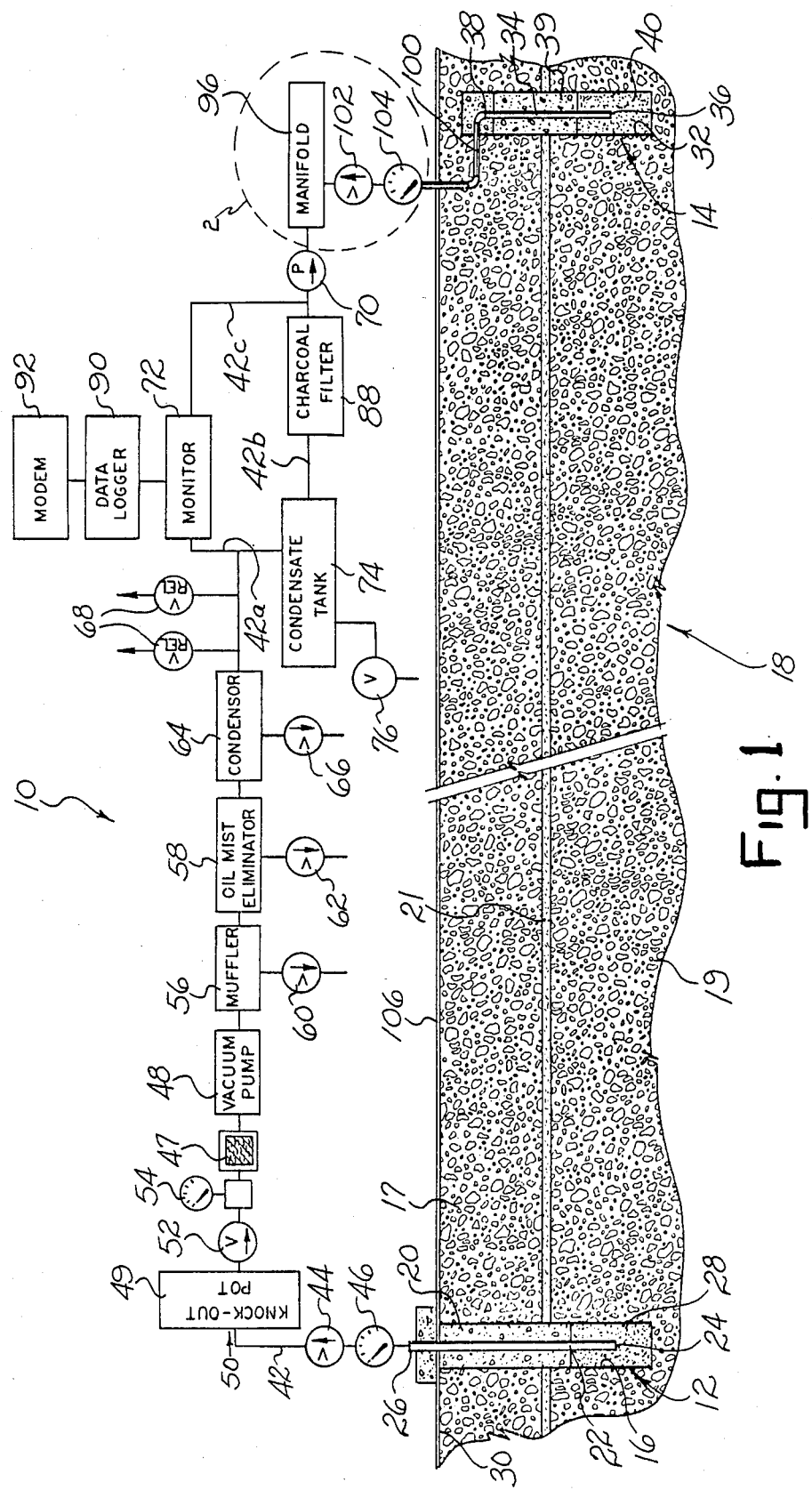
FIG. 1 is a schematic cross-sectional view of the contaminant recovery apparatus according to the principles of the invention.

The preferred methods and apparati herein described are not intended to be exhaustive or to limit the invention to the precise forms disclosed. They are chosen and described to explain the principles of the invention, and the application of the method to practical uses, so that others skilled in the art may practice the invention.

The preferred method herein described may be best understood by following the description of the apparatus designated generally by the numeral 10 in the drawings. Apparatus 10 includes a withdrawal well 12 which is surrounded by a plurality of air injection wells 14 radially spaced from the withdrawal wells. Withdrawal well 12 is formed by establishing a borehole 16 into the vadose layer 18 of contaminated earth above the water table (not shown) with the borehole terminating above the water table. Vadose zone 18 may be of varying stratigraphic compositions, but for illustrative purposes is shown as including two layers 17, 19 of permeable stratum below surface 30, with an intermediate impermeable layer 21 separating the two permeable layers. Loose pack fill 28, such as gravel is then poured into borehole 16 to a predetermined depth. Conduit, such as impermeable galvanized steel tubing 22 is positioned in borehole 16 spaced from the borehole outer wall just above fill material 28. Tubing 22 is open at its lower end 24 and at its upper end 26. Fluid permeable loose pack fill 28 is then backfilled into borehole 16 to a level just above tubing lower end 24 as determined by the individual site soil conditions. A quantity of impermeable fill 20 (such as bentonite or the like) is then packed about the remaining length of tubing 22 to the surface level 30, with the tubing upper end 26 extending slightly above the surface level.

Each air injection well 14 is formed by establishing a borehole 32 in vadose layer 18 with the borehole terminating above the water table (not shown). Conduit, such as impermeable PVC tubing 34 is positioned in borehole 32 spaced from the borehole outer walls. Tubing 34 is open at its lower end 36 and at its upper end 38. A quantity of fluid permeable fill material such as loose pack gravel 40 is backfilled into borehole 32 to a level just above the tubing lower end 36. A quantity of impermeable fill 39 (such as bentonite or concrete) is then packed about the remaining length of tubing 34 to surface level 30 as shown in FIGS. 1 and 5. Boreholes 16, 32 are shown as terminating in stratum layer 19, but it is understood that if contaminant is present in layer 17 that the boreholes may be drilled to allow contaminant withdrawal from this layer. Depth of wells 12, 14 will be dependent upon individual site stratigraphy and contaminant location and is not limited by this disclosure.

It is understood that multiple withdrawal wells 12 may be formed to treat large volumes of contaminated earth. Multiple withdrawal wells 12 may also be used in smaller areas where the subsurface stratum configuration requires. Such techniques as placing of wells 12 and 14, as well as the appropriate depths of boreholes 16 and 32 are well within the realm of those skilled in the art.

Conduit tubing 22 and 34 are preferably connected by a conduit 42 connected to the upper ends 26 and 38 of the respective tubing to form a closed loop circuit. Valves 44 may be positioned along conduit 42 adjacent tubing upper ends 26 and 38 to regulate air flow to and from conduits 22 and 34. Gauges 46 positioned adjacent valves 44 indicate the current air pressure level at the wellheads.

Along conduit 42 between tubing ends 26 and 38 may be connected a variety of testing and filtering devices which are shown in FIG. 1. It is understood that these devices are not all necessary to the practice of the invention and elimination of one or more of them may be had and still maintain the spirit of this invention. The first such device is a conventional knock-out pot 49 which acts to encourage condensation of liquid water and/or contaminant from the air stream to maximize system efficiency. After passing through knock-out 49, the air stream passes through a solid particle filter 47 which screens out solid particles drawn up through conduit tubings 22 and 42 and which prevents mechanical damage to the vacuum source. The air stream then passes through a vacuum source 48 which may be a vacuum pump (as shown), blower, exhaust fan or the like. Vacuum source 48 is oriented to drive the air stream in the direction indicated by arrows 50 of FIG. 1. Limit switches (not shown) may be included to shut down device 10 if conditions injurious to vacuum source 48 should occur. A valve 52 and gauge 54 may be positioned along conduit 42 to regulate and indicate air pressure at certain points along conduit 42.

After passing through vacuum source 48, the air stream may pass through exhaust muffler 56 and oil mist eliminator 58 which together act to capture any oil lost by the vacuum source, and also to collect water and/or contaminant for disposal through drain valves, respectively 60 and 62. The air stream may then pass through heat exchange condenser 64 which may be cooled by non-contact water to enhance vapor condensation for collection through drain valve 66. One or more vacuum relief valves 68 may be positioned along conduit 42 as shown to prevent excessive load on the air injection pump 70.

After passing through condenser 64, conduit 42 may be split into a high level contaminant monitor line 42a and a main flow contaminant line 42b. A quantitative monitor 72 is connected to and in fluid flow communication with high level contaminant line 42a and is utilized to measure contaminant vapor concentration within conduit 42. Limit switches (not shown) are connected to monitor 72 and serve to shut down device 10 if contaminant vapor concentration exceeds a predetermined value. A condensate tank 74 is connected to and in fluid flow communication with main flow line 42b and may be equipped with a drain valve 76 for removal of condensate (oil, water and/or contaminant) and may include a limit switch to shut down device 10 if a preset limit is reached.

The air stream next passes into a neutralizing member 88 which is in flow communication with line 42b. Neutralizing member may be an activated carbon bed which captures contaminant by adsorption, alternatively it may be a source of heat, catalysts, or other treatment members which allow neutralization or capture of the contaminant. After treatment in member 88 the air stream passes into a contaminant sample line 42c connected to monitor 72 where it is analyzed for contaminant vapor concentration prior to delivery to air injection wells 14. Information concerning the contaminant is stored in a data logger 90 which may be accessed by a remote operator through telephone modem 92.

Figure 2:
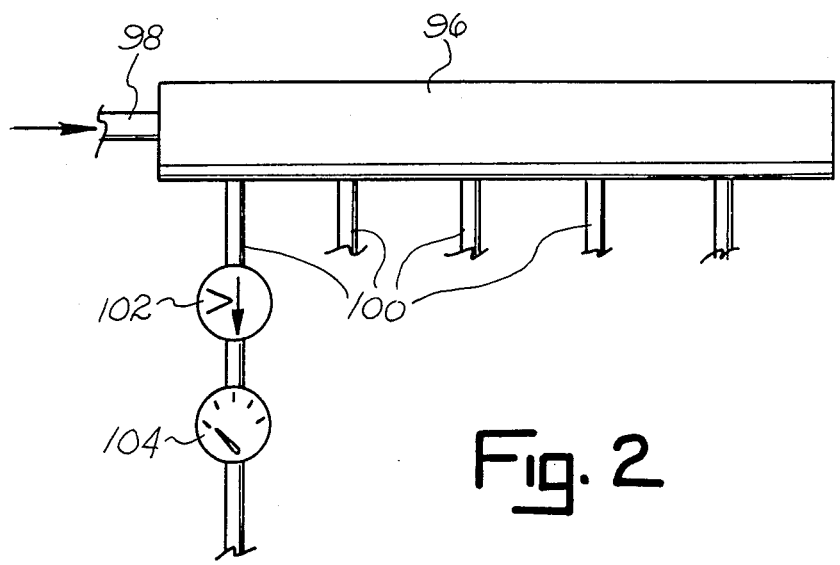
FIG. 2 is an elevational view of the manifold used at the air injection wells.
Figure 3:
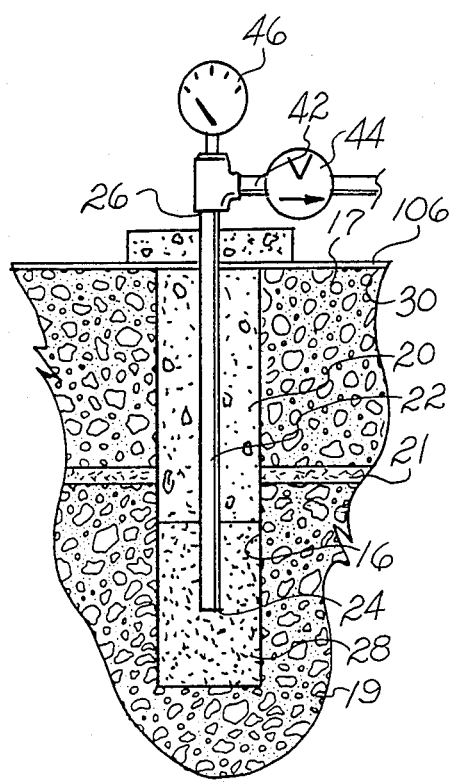
FIG. 3 is a fragmentary cross-sectional view of a vacuum withdrawal well of FIG. 1.
Figure 4:
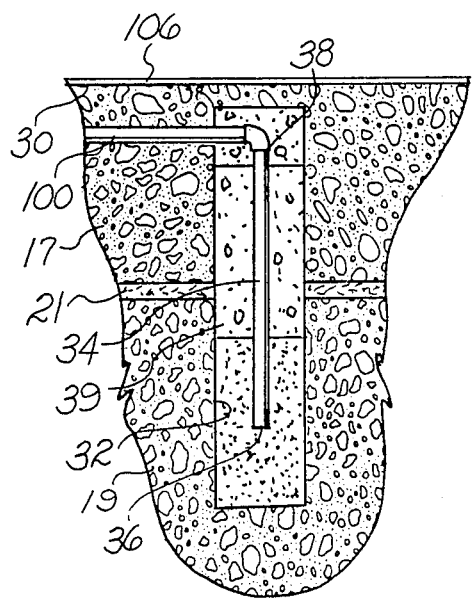
FIG. 4 is a fragmentary cross-sectional view of an air injection well of FIG. 1.

The air stream then passes through injection compression source 70 which is preferably a blower or pump in communication with conduit 42 and which increases the pressure and volume to air injection wells 14 while reducing back pressure on vacuum source 48. Injection source 70 delivers the compressed air stream to a manifold 96 for distribution to air injection wells 14. Manifold 96 is illustrated in FIG. 2 and includes a single inlet 98 and one or more outlets 100 which communicate with air injection wells 14 through tubing 34. Valves 102 and gauges 104 accurately measure and regulate source pressure at each manifold outlet 100. The entire ground surface 30 is preferably covered by a fluid impermeable cover 106 of impervious vinyl or similar material to prevent percolation of air, water and contaminant through the surface during recovery operations.

Device 10 is preferably operated as follows. With all components operatively connected, an operator switches on vacuum source 48 and air injection compression source 70. Vacuum source 48 creates an area of substantially reduced pressure in vadose layer 18 about withdrawal well 12 to cause contaminants contained therein to vaporize and be drawn into conduit tubing 22, and through conduit 42 where the contaminant is eventually captured or neutralized by member 88. Any residual air drawn into the system is then charged from conduit 42 back into vadose layer 18 through air injection wells 14 under pressure by compression source 94 to encourage migration of additional contaminants in the vadose layer to move toward withdrawal well 12 where they may be vaporized and collected for neutralization or capture. A continuous closed-loop process is the result.

It should be noted that site stratigraphy will normally dictate the depths and configurations of withdrawal wells 12 and air injection wells 14. Several modifications of the device 10 may be possible depending upon site conditions and regulatory agency requirements. The scope of the invention is therefore not to be considered limited by the above disclosure, and modifications are possible without departing from the spirit of the invention as evidenced by the following claims.

I claim:

1. A method of recovering and controlling a volatile contaminant from a vadose layer of contaminated earth comprising the steps of:

establishing a first borehole in said contaminated earth, said first borehole terminating in said vadose layer;

establishing a second borehole spaced from said first borehole in said contaminated earth and which terminates in said vadose layer;

positioning a first conduit in said first borehole, said first conduit extending from said borehole to above ground level, with said first conduit being of smaller diameter than said first borehole;

positioning a second conduit in said second borehole, with the second conduit extending from said second borehole to above the ground level, with said second conduit being of smaller diameter than said second borehole;

packing a fill material about each first and second conduit in their respective boreholes;

operatively connecting said first and second conduits by a third conduit wherein said first conduit is in fluid flow communication with said second conduit;

positioning means for neutralizing said volatile contaminant along said third conduit in flow communication therewith;

positioning first pump means for drawing gasses from said contaminated earth in flow communication with said first and second conduits;

activating said first pump means wherein gas is drawn out of said vadose layer to create an area of substantially reduced pressure which causes substantial quantities of said volatile contaminant to vaporize and be drawn up through said first conduit into said neutralizing means to produce clean air;

positioning a second pump means between said neutralizing means and said second conduit in flow communication therewith wherein said clean air is passed under pressure from said neutralizing means into said second conduit to enhance gas flow in said vadose layer towards said first borehole; and positioning a cover formed of fluid impervious material atop said ground level about each borehole whereby said clean air remains in said vadose layer and urges said contaminant towards said first borehole.

2. The method of claim 1 wherein said first and second conduits are formed of impermeable tubing having an upper opening and a lower opening, said third conduit is formed of impermeable tubing having first and second end openings, each first and second conduit upper opening in flow communication with said third conduit through one of said third conduit first and second openings.

3. The method of claim 1 wherein a portion of said fill material is formed of a fluid permeable substance packed in each borehole to a level just above each conduit lower opening, with a remaining portion of said fill material formed of a generally fluid impermeable substance.

4. Apparatus for recovery and neutralization of volatile contaminants from a vadose layer of contaminated earth, said apparatus comprising a first conduit positioned within a first borehole terminating in said vadose layer, said conduit extending from said first borehole above ground level, a second conduit positioned within a second borehole spaced from said first borehole and terminating in said vadose layer, said second conduit extending from said second borehole to above said ground level, said first conduit operatively connected to and in flow communication with said second conduit by a third conduit, first pump means positioned along one of said first and third conduits for drawing gasses from said vadose layer to produce a substantial area of reduced pressure in said first conduit wherein said volatile contaminant is vaporized and drawn from the ground, means for neutralizing said volatile contaminant positioned in flow communication with one of said first and third conduits to produce a purified fluid, said apparatus further including a cover formed of fluid impervious material positioned atop said ground level about each borehole whereby said purified fluid remains in said vadose layer and urges said contaminant towards said borehole, and second pump means for passing said purified fluid from said neutralizing means into said second conduit and back into said vadose layer under pressure to enhance gas flow in said vadose layer towards first borehole.

5. Apparatus of claim 4 and means positioned along and in flow communication with said third conduit for effecting condensation of said volatile contaminant after drawing up through said first conduit prior to the entry of the contaminant into said neutralizing means.

6. Apparatus of claim 4 wherein said first borehole is a vacuum withdrawal well, and said second borehole is an air injection well and includes a plurality of boreholes radially spaced about said vacuum withdrawal well to form a recovery area whereby passing said purified fluid through said air injection wells urges said contaminant present in said recovery area towards said vacuum withdrawal well.

7. Apparatus of claim 6 wherein said third conduit includes a manifold means for selectively passing said purified fluid from said neutralizing means to one or more of said air injection wells.

8. Apparatus of claim 4 and monitoring means positioned along said third conduit for monitoring the concentration of said volatile contaminant within said third conduit, and means associated with said monitoring means for shutting down said first and second pump means when the concentration of said contaminant in said third conduit reaches a predetermined excess level.

9. Apparatus of claim 8 and means in communication with said monitoring means for analyzing gas present in said third conduit for contaminant concentration prior to releasing said gas to said second pump means.

* * * * *